United States Patent [19]

Casey

[11] 3,744,860

[45] July 10, 1973

[54] BEARING ARRANGEMENT FOR IDLER WHEELS

[75] Inventor: Robert Casey, Washington, Ill.

[73] Assignee: Caterpillar Tractor Co., Peoria, Ill.

[22] Filed: July 19, 1971

[21] Appl. No.: 163,628

[52] U.S. Cl. ............................................... 308/109
[51] Int. Cl. .......................................... F16c 13/02
[58] Field of Search ..................... 308/36.1, 109, 18

[56] References Cited
UNITED STATES PATENTS

| 2,206,488 | 7/1940 | Povlecka et al. | 308/36.2 |
| 3,382,013 | 5/1968 | Toth et al. | 308/18 |
| 3,515,446 | 6/1970 | Maguire | 308/109 |
| 2,915,326 | 12/1959 | Mason | 308/361 |

Primary Examiner—Charles J. Myhre
Assistant Examiner—Frank Susko
Attorney—Charles M. Fryer, Freling E. Baker et al.

[57] ABSTRACT

A bearing arrangement for rotatably mounting an idler wheel about a stationary shaft comprises a bushing having a raised annular shoulder adjacent a cylindrical end portion defining a radial face therebetween. The face abuts one end of a bore formed in the idler wheel for mounting the cylindrical end portion of the bushing. The outer end of the bushing is adjacent an annular face of a supporting bracket whereby axial thrust loads transmitted into the bushing by means of the radial face are imparted into the supporting member without being first transmitted through the shaft.

7 Claims, 3 Drawing Figures

PATENTED JUL 10 1973 3,744,860
SHEET 1 OF 2
Fig_1_
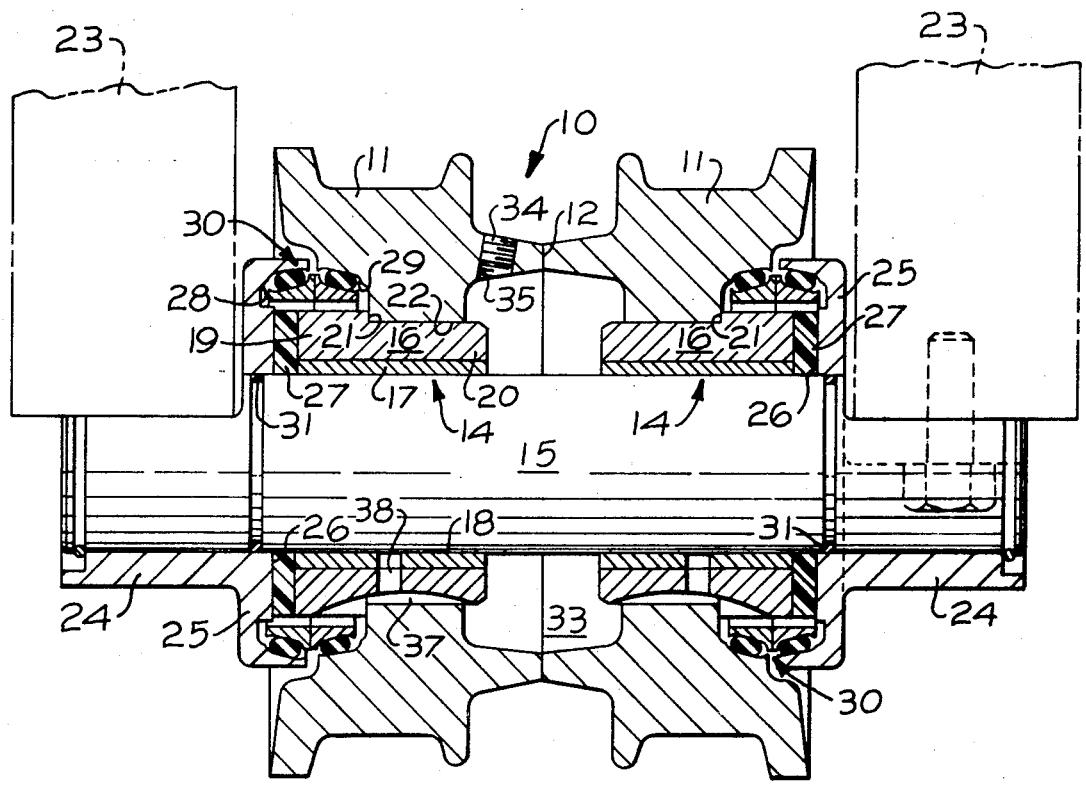
Fig_3_
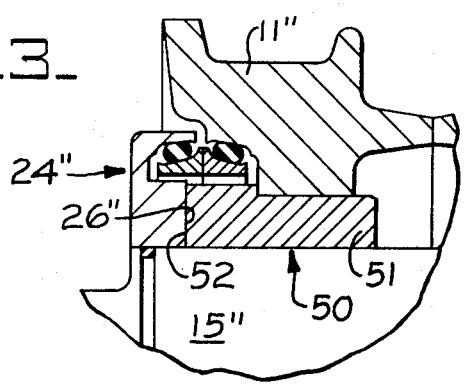
INVENTOR
ROBERT CASEY
BY
Fryer, Tjensvold, Feix, Phillips & Lempio
ATTORNEYS

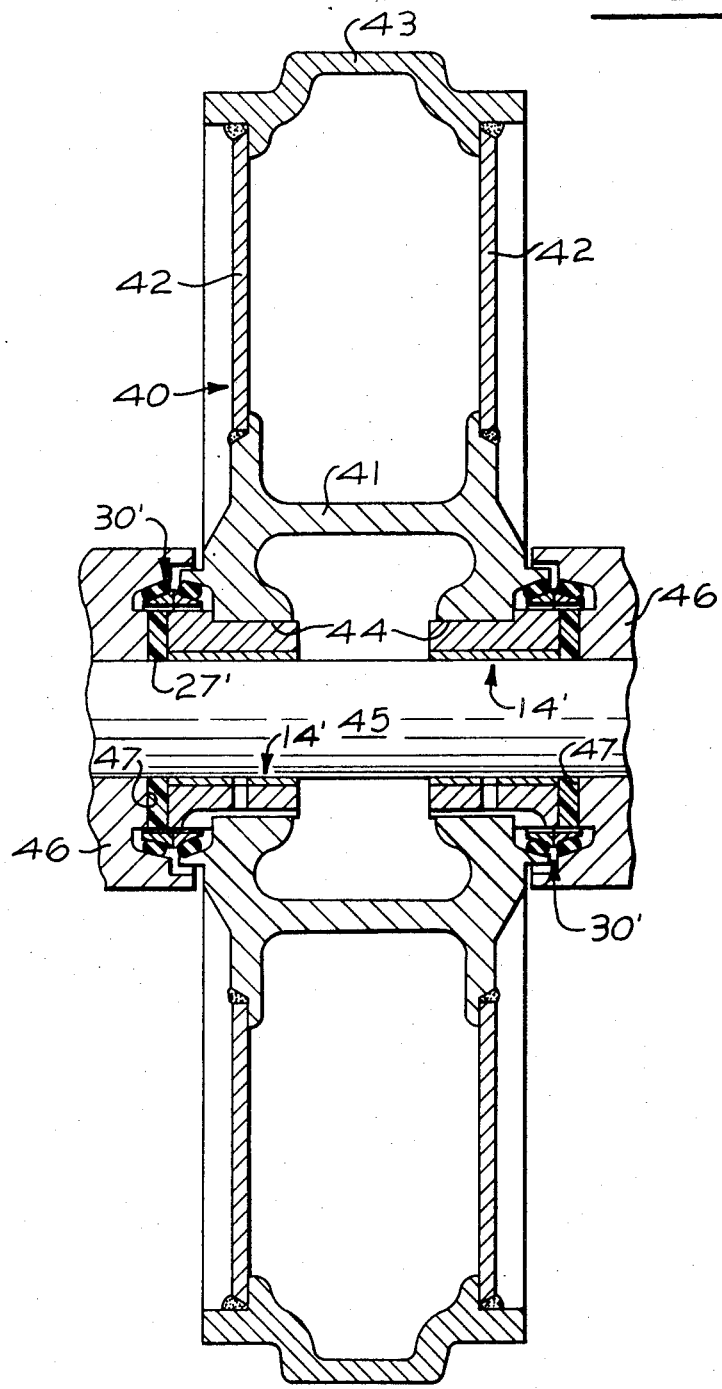

3,744,860

BEARING ARRANGEMENT FOR IDLER WHEELS

BACKGROUND OF THE INVENTION

This invention relates generally to bearings for idler wheels mounted for rotation about a stationary shaft and more particularly to track engaging rollers and idlers of track-type vehicles.

Most prior art track rollers are provided with shafts having thrust surfaces formed thereon for transmitting thrust loads from the roller into a supporting structure. This not only necessitates a shaft which is larger and more expensive to manufacture, but also requires that the shaft be made stronger in order to transmit these additional loads. This construction generally requires that the shaft be formed by forging and complex machining as well as drilling of lubricating passages. Furthermore, track rollers having this this type of shaft are much more difficult to assemble or disassemble because the shaft cannot be removed without also removing the end collars, bearings and seals.

Others have tried to overcome this problem by utilizing a combination axial contact seal and thrust bearing as disclosed in U.S. Pat. No. 3,420,584. However, transmitting thrust loads through the seal and associated gasket members affects the performance of the seal members causing an eventual leakage problem.

SUMMARY AND OBJECTS OF THIS INVENTION

It is an object of this invention to overcome the above briefly described problems by providing a low-cost, and non-complex idler wheel exhibiting high load carrying capabilities with a minimum of parts and structural weight.

Another object of this invention is to provide an idler wheel assembly that is easily disassembled for repair or replacement of worn parts.

The invention essentially comprises a bearing arrangement, radially and axially secured to an idler wheel for rotation on a straight shaft wherein the bearing arrangement imparts radial loads to the shaft and axial thrust loads to an adjacent supporting bracket.

BRIEF DESCRIPTION OF THE DRAWINGS

Other objects and advantages of this invention will become apparent from the following description and accompanying drawings wherein:

FIG. 1 is a cross sectional view of a track roller employing a preferred embodiment of the present invention;

FIG. 2 is a cross sectional view of an idler wheel embodying a modified form of the present invention; and FIG. 3 is a fragmentary sectional view of a track roller similar to that of FIG. 1, illustrating a further modification of the present invention.

DESCRIPTION OF THE PREFERRED EMBODIMENTS

Referring now to the drawings, and in particular to FIG. 1, there is illustrated a preferred embodiment of the present invention incorporated in an idler wheel, such as a track roller generally designated by the number 10, which may constitute two track-engaging rims 11 welded or otherwise suitably secured together at 12. The track roller assembly further comprises a pair of spaced apart bearing arrangements 14 to rotatably mount the roller about a solid cylindrical shaft 15.

Each bearing arrangement 14 is preferably comprised of a bushing 16 forming a hub for each rim 11 and having a sleeve bearing 17 contained therein to provide a radially inner bearing surface 18. Bushing 16 has a raised annular shoulder portion 19 adjacent a cylindrical end portion 20 defining a radial face 21 therebetween. Cylindrical end portions 20 are press-fitted into spaced apart bores 22 in rims 11 such that radial face 21 abuts the outer face of bore 22 to prevent axial movement therebetween.

Shaft 15 is secured at its ends to frame 23 of a track type vehicle (not shown) by supporting brackets 24 in a conventional manner, such as by bolting. Each bracket 24 has an annular plate portion 25 having a radial inner face portion 26. An annular thrust bearing 27 is attached as by bonding to said inner face 26, and positioned adjacent one end of bushing 16 so that thrust loads acting on the track roller may be imparted thereto. Plate portion 25 is further provided with an annular groove 28 positioned outwardly from said thrust bearing 27 and confronting a similar annular groove 29 formed in rims 11 adjacent bores 22. Grooves 28 and 29 cooperate to receive therebetween an annular sealing means or floating metal ring seal assemblies 30. Such a sealing means is fully disclosed in U.S. Pat. No. 3,180,648 for "Seals," assigned to the Assignee of this application.

An annular seal element 31, preferably of the elastomeric type, is positioned in a groove formed in shaft 15 to abut plate 25 to cooperate with sealing means 30 for retaining lubricating fluid within the track roller. It should be noted that the above described constructions 16 through 31 are duplicated at each side of the track roller.

A lubricating means for the track roller comprising a large chamber 33, defined by the annular recess between spaced bores 22 of rims 11, the inner ends of bearing arrangements 14, and the periphery of shaft 15, is adapted to be filled with a standard lubricating oil. A plug 34 is removably attached to one of the rims 11 exposing a charging port 35 for selectively filling the track roller with lubricating oil. However, it should be understood that the utilization of such a plug in rim 11 is not intended to be the sole means for filling chamber 33, as other means known to those skilled in the art may also be utilized as well. However, such an arrangement eliminates the need for lubricating grooves and passages in the shaft which would tend to weaken it and complicate its construction.

A passage means for communicating lubricating oil to the bearing surfaces and seals comprises an axial slot 37 and a radial passage 38. Axial slots 37, preferably formed in the periphery of bushings or hubs 16, extend from chamber 33 to seal means 30 and thrust bearings 27. Radial passages 38, formed through bearing arrangements 14, intersect slots 37 to communicate lubricating oil to bearing surfaces 18.

FIG. 2 illustrates the above-described bearing arrangement and sealing means utilized in an idler wheel assembly generally indicated by the numeral 40 wherein like structures are depicted by like numerals primed ('). The idler wheel assembly 40 comprises an annular hub 41 having a pair of spaced apart annular plates 42 attached to the ends thereof, and a track engaging rim 43 attached to the periphery of said plates. Idler wheel 40 further comprises bearing arrangements 14' mounted in spaced apart bores 44 formed in hub 41 for rotation therewith about idler shaft 45. The ends of shaft 45 are connected to supporting brackets 46 to mount the idler to the track-type vehicle frame (not shown). Similarly positioned between the outer end of bearing arrangement 14' and an inner face 47 of bracket 46 is a thrust bearing 27' for transmitting thrust loads therebetween. Confronting annular grooves formed in hub 41 and bracket 46, similarly function to retain annular sealing means 30' therein. Other features not described for the FIG. 2 embodiment are likewise similar to those described for FIG. 1.

FIG. 3 illustrates a modification to the bearing arrangement of the present invention wherein like structures have like numerals double primed (''). In the FIG. 3 embodiment, bearing arrangement 50 is comprised of bushing 51 made from a bearing-like material, such as sintered iron, which eliminates the need for the sleeve bearing 17 and the thrust bearing 27 of the FIG. 1 embodiment. Bushing 51 is similarly attached to rim 11'' for rotation therewith about shaft 15''. Outer face 52 of bushing 51 abuts the inner face 26'' of bracket 24'' for transmitting thrust loads therebetween.

As suggested above, a number of advantageous results accrue from the novel features employed in the above-described embodiments. For example, the bearing arrangements described therein permit the use of a straight solid cylindrical shaft which is less expensive to manufacture than the stepped shaft of prior art track rollers. Furthermore, the imparting of thrust loads directly into the supporting brackets prevents undue shaft deflections which may hinder the performance of the bearings and seals and cause early failure thereof. Also, the lack of thrust means on the shaft permits the location of the center of the radial load bearings to be coincident to the center of the loads imparted on the idler wheel. The use of a bushing-type hub having a heavy section permits the outward extension of the radial bearing's length beyond where it is supported by the rim, thereby distributing the somewhat concentrated loads on the roller over a greater area. It should be noted that it is less expensive to add the bushing than to machine out metal to provide a groove for the seal assembly. Further desiderata reside in the uniquely integrated idler wheel components which may be readily fabricated, assembled and disassembled for servicing and replacement purposes.

While the present invention has been shown and illustrated with respect to several illustrative forms, it will be obvious to those skilled in the art that various changes and modifications may be made without departing from the spirit and scope of the present invention as set forth in the appended claims.

What is claimed is:

1. In a track roller comprising a cylindrical rim assembly rotatably mounted on a non-rotatable shaft, said shaft forming a solid body portion having cylindrical shaped spaced apart bearing surfaces thereof, lubricating means comprising a chamber having a substantially annular cross-section around said shaft and adapted to retain lubricating oil therein, a pair of support brackets embracing the ends of said shaft for attaching said shaft to a supporting frame, an annular thrust bearing carried by each of said support brackets; a pair of axially spaced removable hubs, each of said hubs comprising an annular sleeve press fitted into said rim assembly for supporting said rim assembly on said bearing surfaces of said shaft, and including an annular shoulder for transmitting thrust from said rim to said thrust bearings.

2. The invention of claim 1 including a sleeve bearing in each of said hubs; and,
    means for communicating lubricating oil from said chamber to said bearings.

3. The invention of claim 2 wherein said means for communicating lubricating oil to said bearings comprise a groove formed in said hub.

4. The invention of claim 3 comprising seal means disposed outward of said bearings to prevent escape of lubricating oil from said assembly.

5. A track roller assembly for a track type tractor comprising in combination:
    a cylindrical shaft non-rotatably supported between a pair of rails;
    a supporting bracket attached to each end of said shaft for securing said shaft to said rails, and having an annular inner thrust bearing face portion;
    a hub and bearing arrangement detachably press fitted into each end of the idler wheel for rotation therewith such that axial and radial loads acting on said idler wheel are transmitted thereto, said bearing arrangement having a cylindrical bearing surface rotatably mounted on said shaft for transmitting radial loads thereto, and an annular radially extending axially directed bearing face at the outer end thereof contacting the inner thrust bearing face portion of said bracket for transmitting axial thrust loads thereto;
    annular sealing means positioned radially outwardly from the bearing arrangement and disposed between one end of said idler and the inner face of said bracket; and,
    lubricating means for providing lubricating oil to said bearing surfaces and sealing means to prevent escape of said oil from said assembly.

6. The invention of claim 3 wherein the hub and bearing arrangement comprises a bushing having a raised annular shoulder portion adjacent a cylindrical end portion defining a radial face therebetween, said end portion being non-rotatably mounted in a bore of said idler for rotation therewith and said radial face abutting one end of said bore for preventing axial movement therebetween, a sleeve bearing mounted in said bushing for rotation therewith, and an annular thrust bushing positioned adjacent the outer end of said bushing for transmitting thrust loads between the idler wheel and bracket.

7. The invention of claim 5 wherein the bearing arrangement is a one-piece bushing mounted for rotation on said shaft constructed of a bearing-type material comprising a raised annular shoulder portion, a cylindrical end portion adjacent said shoulder defining a radial face therebetween, said end portion being nonrotatably mounted in a bore of said idler wheel, said radial face abutting one end of said bore for preventing axial movement therebetween, and one end of said bushing positioned adjacent the inner face of said bracket for transmitting thrust loads therebetween.

* * * * *